US012726797B1

(12) United States Patent
Warner et al.

(10) Patent No.: US 12,726,797 B1
(45) Date of Patent: Sep. 1, 2026

(54) SYSTEMS, DEVICES, AND METHODS MANAGING MESSAGING IN A MULTI-USER ENVIRONMENT

(71) Applicant: Lingual Information System Technologies, Inc., Elkridge, MD (US)

(72) Inventors: Paul J. Warner, Silver Spring, MD (US); Elizabeth Rendon-Sherman, Ellicott City, MD (US)

(73) Assignee: Lingual Information System Technologies, Inc., Elkridge, MD (US)

( * ) Notice: Subject to any disclaimer, the term of this patent is extended or adjusted under 35 U.S.C. 154(b) by 301 days.

(21) Appl. No.: 18/621,344

(22) Filed: Mar. 29, 2024

Related U.S. Application Data

(60) Provisional application No. 63/493,914, filed on Apr. 3, 2023.

(51) Int. Cl.
*H04W 4/12* (2009.01)
*H04W 4/14* (2009.01)
*H04W 4/16* (2009.01)

(52) U.S. Cl.
CPC ............... *H04W 4/14* (2013.01); *H04W 4/16* (2013.01)

(58) Field of Classification Search
CPC .................................. H04W 4/14; H04W 4/16
USPC .......................................................... 455/466
See application file for complete search history.

(56) References Cited

U.S. PATENT DOCUMENTS 5,594,910 A 1/1997 Filepp et al.
7,116,994 B2 10/2006 Hatch
7,363,026 B2 4/2008 Clarke et al.
7,945,634 B1 5/2011 Huda
8,014,402 B2 9/2011 Harris
8,121,626 B1 2/2012 Kirchhoff et al.
8,626,209 B1 1/2014 Mullen
8,874,148 B2 10/2014 Herz et al.
9,055,418 B2 6/2015 Cho et al.
9,706,050 B2 7/2017 Kumar et al.
10,880,322 B1 * 12/2020 Jakobsson ............... H04L 51/08
11,502,985 B1 11/2022 Dorsey
2006/0293032 A1 12/2006 Clarke
2018/0374171 A1 * 12/2018 Aizen .................. G06V 30/416

(Continued)

FOREIGN PATENT DOCUMENTS

EP 1322126 6/2003
WO 2006062900 6/2006

*Primary Examiner* — Tanmay K Shah

(74) *Attorney, Agent, or Firm* — Nemphos Braue LLC; Michael Antone

(57) ABSTRACT

Systems and methods are disclosed that enable organizations to manage account/application access and alerts, while reducing unauthorized access to the accounts/applications, by centralizing messaging from third parties related to N-Factor authentication, alerts, etc. The system generally includes one or more devices including processors and at least one interface to maintain user data, correlations, and data, such as SMS codes, email addresses, etc. In various embodiments, a multi-user operation, such as a business, users direct SMS or email based one-time codes used for N-Factor authentication to a centralized system by using the organization's assigned cell devices, numbers, and/or email addresses, which in-turn, convert the message into an email message or phone call and route the incoming code to the correct individual(s) associated with the number that sent the SMS code.

20 Claims, 6 Drawing Sheets

(56) References Cited

U.S. PATENT DOCUMENTS

2018/0375877 A1* 12/2018 Jakobsson ............. G06F 16/955
2020/0076784 A1* 3/2020 Renner ................... H04L 63/08
2024/0220877 A1* 7/2024 Singh ............... G06Q 10/06311

* cited by examiner 10
22

3rd Party
3rd Party Comm Interface
Traffic Monitor
Personnel Interface
Entity Personnel
12
18
Processor
Administrative Interface
Administrator
14
20
Storage including memory
16

10
22

3rd Party
Traffic Monitor
Personnel
3rd Party Comm Interface
Personnel Interface
18
12
Processor
Administrative Interface
Administrator
14
20
Storage including memory
16

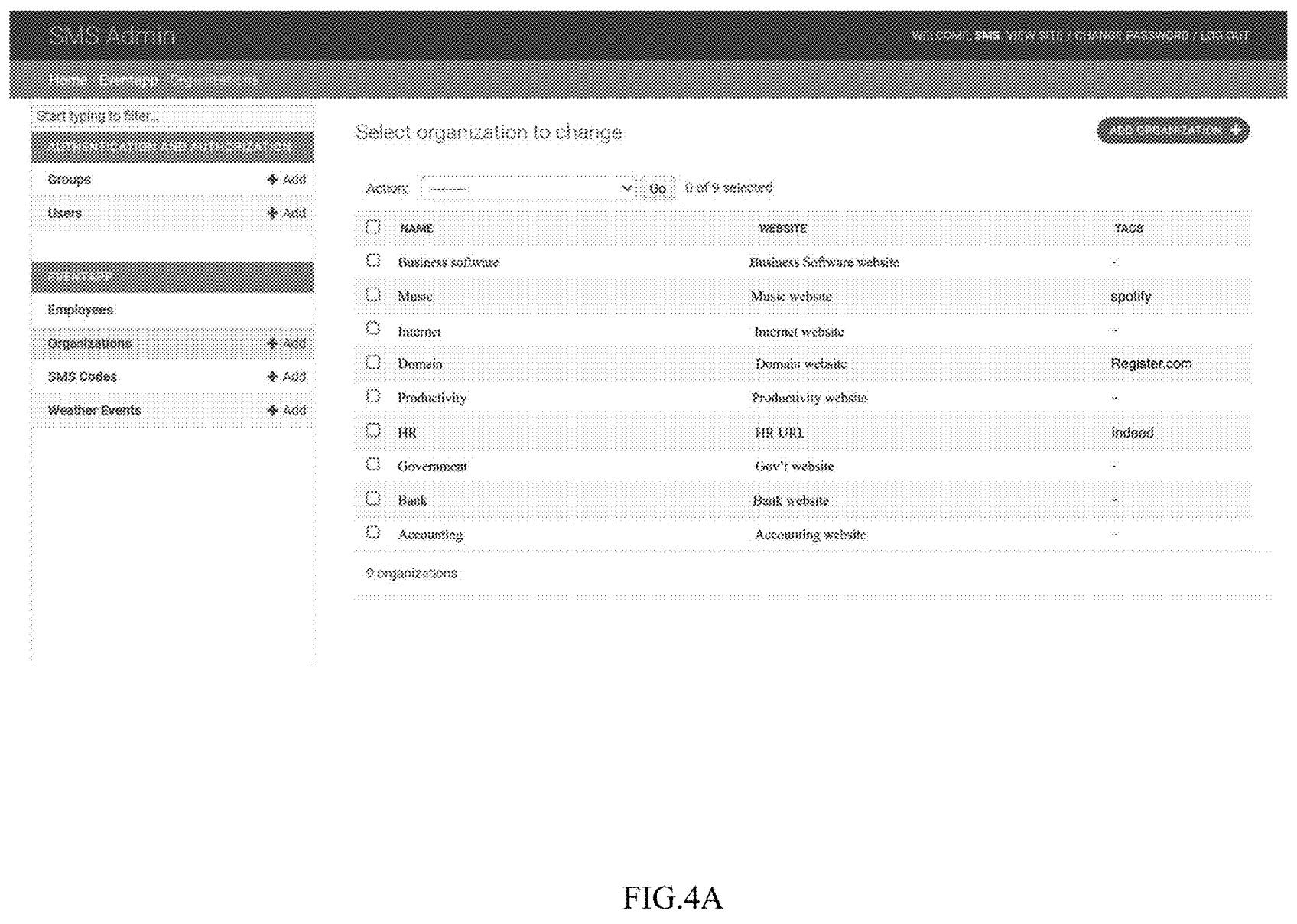

SMS Admin

WELCOME, SMS. VIEW SITE / CHANGE PASSWORD / LOG OUT

Home › Eventapp › Organizations

Start typing to filter...

AUTHENTICATION AND AUTHORIZATION

Groups + Add

Users + Add

EVENTAPP

Employees

Organizations + Add

SMS Codes + Add

Weather Events + Add

Select organization to change

ADD ORGANIZATION +

Action: --------- Go 0 of 9 selected

| NAME | WEBSITE | TAGS |
|---|---|---|
| Business software | Business Software website | - |
| Music | Music website | spotify |
| Internet | Internet website | - |
| Domain | Domain website | Register.com |
| Productivity | Productivity website | - |
| HR | HR URL | indeed |
| Government | Gov't website | - |
| Bank | Bank website | - |
| Accounting | Accounting website | - |

9 organizations

FIG.4A

SYSTEMS, DEVICES, AND METHODS MANAGING MESSAGING IN A MULTI-USER ENVIRONMENT

CROSS-REFERENCE TO RELATED APPLICATIONS

This application claims the benefit of and priority to U.S. Provisional Patent Application No. 63/493,914 filed 2023 Apr. 3, the disclosure of which is incorporated herein by reference in its entirety.

BACKGROUND OF THE INVENTION

Field of the Invention

The present invention relates in general to processing in-bound communications in a multi-user environment. More specifically, the present invention relates to managing multi-factor authentication in a multi-user environment.

STATEMENT REGARDING FEDERALLY SPONSORED RESEARCH OR DEVELOPMENT

Not Applicable

Background Art

Multi-factor authentication and alert systems are increasing in popularity as technology advances have reduced implementation costs across a wide variety of applications. However, since the general purpose of authentication is to authenticate the identity of specific individual, these techniques can create challenges in a multi-user environment, in which more than one individual may require access to an application or should receive an alert or the individuals using an application or receiving may change over time.

As such, there is a continuing need for improved systems, devices, and methods that enable organizations to manage account/application access and alerts.

BRIEF SUMMARY OF THE INVENTION

Accordingly, hardware and/or software systems, devices, networks, and methods of the present invention enable organizations to manage account/application access and alerts, while reducing unauthorized access to the accounts/applications, by centralizing messages, such as SMS, voice, and email, related to N-Factor authentication, alerts, etc. The system generally includes one or more devices including processors, at least one interface, and storage to maintain user data, correlations, and data, such as SMS short and long codes; herein referred to as SMS code or SMS number, email addresses, etc.

In various embodiments, a multi-user operation, such as a business, users may direct SMS or voice based one-time codes used for N-Factor authentication to a centralized system by using the organization's assigned cell devices/numbers, which in-turn, convert the message into an email message, an alternate SMS or phone call and route the incoming code to the correct individual(s) associated with the entity that sent the SMS code. In cases where the incoming AUTH code is voice based, the system can perform speech to text or optionally forward the voice message to a user's personal phone number or phone number assigned to personnel by the entity. For example, SMS codes related to organizational controlled accounts, such as bank, health, IT, retirement, recruiting, etc. may be directed to the centralized system, which upon receiving a SMS message directs the SMS message to users in the appropriate department that have been associated with the number sending the SMS message via various methods, such as email, text, and voice calls.

In various embodiments, the system provides SMS based authentication distribution by associating a mobile phone number or SMS code to the user along with their current IP address or other unique network object. The system may then distribute the incoming SMS message to the appropriate user via an email message, voice mail (text to speech), alternate SMS code or any other messaging platform when an AUTH request is made. The system can also be configured to forward SMS messages to a users' personal cell phone, alternate email, or other messaging platform if desired. The various user contact data may reside in a data store or optionally, a field within an Active Directory/LDAP store. Optional forwarding assignments may be made by the administrator within a Web front-end.

Various embodiments may employ association processing by monitoring HTTP/HTTPS traffic to associate the originating request with a third-party website, SMS code so that future N-Factor AUTH requests will be routed to the requesting user or configured group. In one such use case, a network switch/router may be configured to mirror the primary traffic port(s). In such a case, this data may be copied to another processor which examines all data from the presence of the assigned entity cell number(s) or a login request to one of the sites previously determined by use of the organization's cell number(s). Such subsequent requests, timings and configurable message tag elements will allow for further refinement of sub-domains and URLs associated with the original domain. In another option, the use of a proxy such as Squid/MITM Proxy may be employed in which network HTTP flows, etc. can be examined for the presence of the assigned organization cell number and/or learned common links used to make such N-FACTOR/SMS requests. In such a case with a proxy server, the adapter to the proxy would examine all data for the presence of the assigned organization's cell number(s). Regardless of a blind or known proxy use cases, the functionality is similar to a standalone monitoring solution. At this point, the packet would indicate the IP address of the request, use a directory service, such as LDAP or Active Directory along with system level calls, e.g., Windows Management Instrumentation (WMI), to associate the station with the currently logged in user. Other variants and terminology exist to accomplish Deep Packet Inspection-Secure Sockets Layer (DPI-SSL) depending on industry vendors. The system can also be configured to not substitute data (e.g., replace cell number) for certain sites and/or users on a particular site.

In various embodiments, the system may change/update user information in outgoing communications to associate entity contact information with authentication requests and alert, for example, changing a non-entity phone number or email address to the entity contact information automatically. In such cases, the user's non-entity information may be stored in the Active Directory or another data store. If outgoing communication is determined to be associated with a verification site, etc., the system may change the information, then send an email to the user and admin to inform them that such a change was made on their behalf. An exception table may be provided where the administrator can enter a URL exception which would allow users to input non-entity contact information, such as personal cell numbers. In cases of SSL pinning, the proxy may be used to detect and inform the administrator of the site/user requiring manual intervention.

Another feature would be to allow the system to change a user's personal cell number to the organization number(s) automatically. In such cases, a user's personal cell may be stored on the Active Directory or another datastore if outgoing traffic is determined to be associated with a verification site, etc.; the HTTP data would be decoded, changed, and re-encoded and sent. The system may then notify the user and/or administrator of the change. The system can also be configured to not substitute data (e.g., replace cell number) for certain sites and/or users on a particular site.

In addition to greater efficiency and effectiveness for the organization in accessing accounts and application and responding to alerts, cost savings may also be realized by reducing total number of cell phones issued to employees. This system also alleviates issues when an employee leaves the organization when their personal cell number was tied to an entity utilizing N-factor authentication which the organization utilizes to conduct operations or for alerting.

BRIEF DESCRIPTION OF THE DRAWINGS

The accompanying drawings are included for the purpose of exemplary illustration of various aspects of the present invention, and not for purposes of limiting the invention, wherein:

FIGS. 4A & 4B illustrates exemplary administrative interfaces of the present invention.

Figure 1:
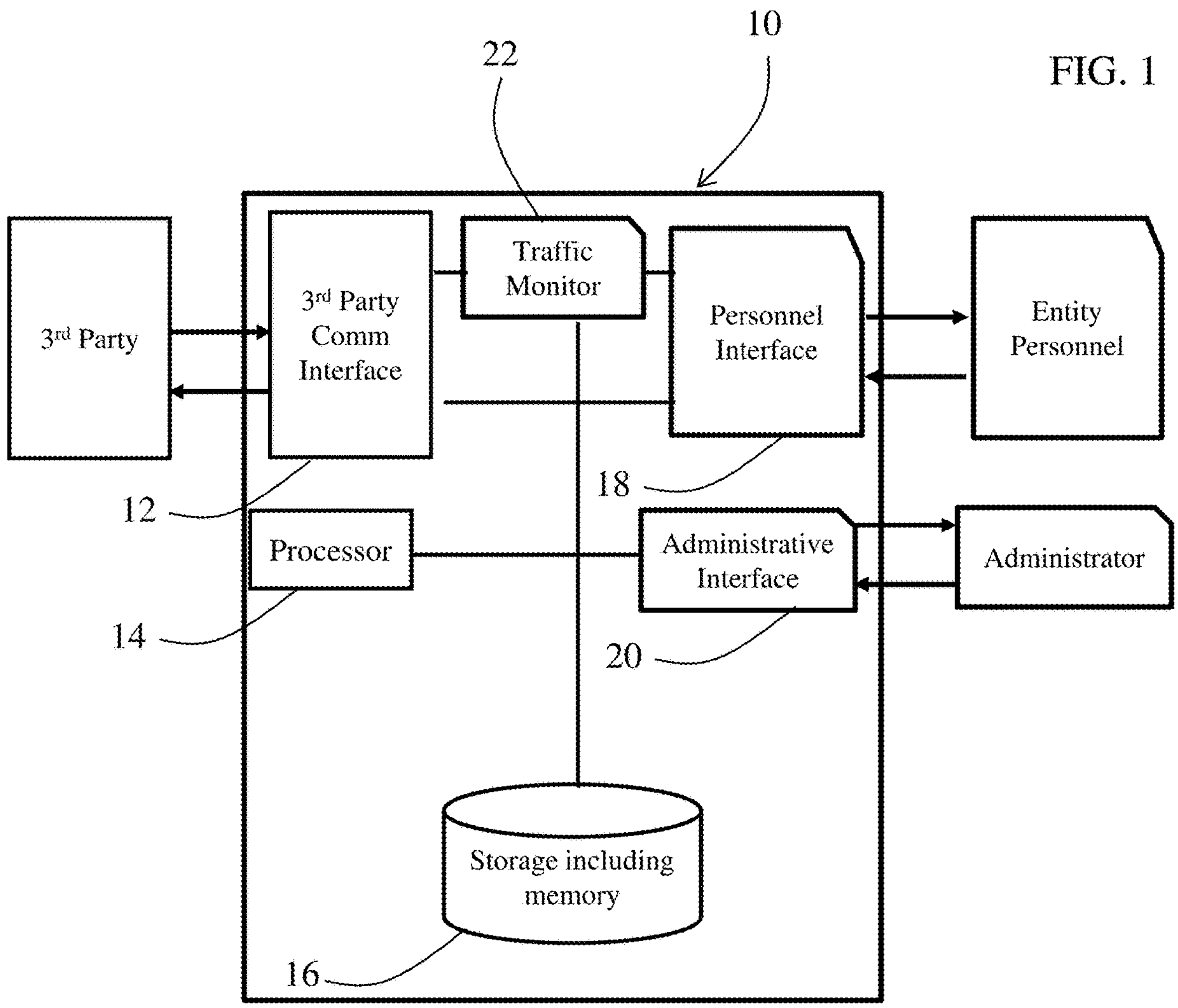
FIG. 1-3 shows exemplary embodiments of the multi-user authentication and alerting system.

In the drawings and detailed description, the same or similar reference numbers may identify the same or similar elements. It will be appreciated that the implementations, features, etc. described with respect to embodiments in specific figures may be implemented with respect to other embodiments in other figures, unless expressly stated, or otherwise not possible.

DETAILED DESCRIPTION OF THE INVENTION

Hardware and/or software systems 10, devices, networks, and methods of the present invention enable organizations to manage account/application access and alerts, while reducing unauthorized access to the accounts/applications, by centralizing messages, such as SMS and email messages, related to N-Factor authentication, alerts, etc.

Figure 2:
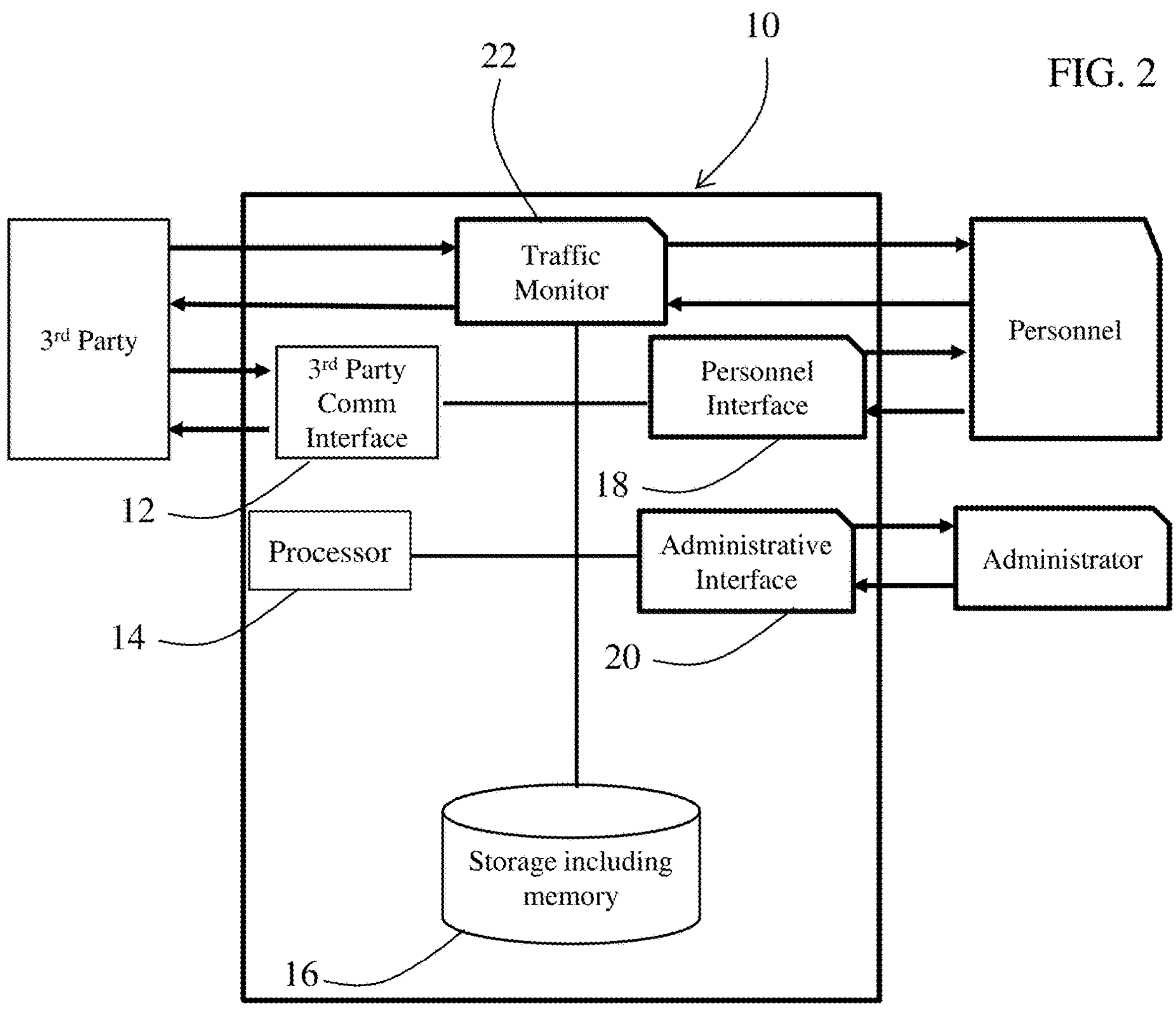

As shown in FIGS. 1 and 2, the system 10 generally may include a third-party communication interface (e.g., one or more cellular devices) 12, one or more processors 14 performing or controlling the functionality of the system 10, storage 16, personnel interface 18, and administrative interface 20. The system 10 may further include a traffic monitor 22 to monitor communications between entity personnel to/a third party. An entity using the system 10 may be a company, a governmental entity, or other organization that may have personnel interacting with third parties on behalf of the entity.

In various embodiments, the third-party communication interface 12 may be configured to interact with a communication interface of the third-party that is sending a notice to the system 10, such as a code to be used in N-factor authentication, a notice or an alert, e.g., security, emergency, etc. or other information to personnel associated with the entity employing the system 10. The third-party communication interface 12 may include an SMS receiver or email server associated with the entity operating the system 10 rather than a specific individual associated with the entity that is the intended recipient personnel of the notice. In various embodiments, the third-party communication interface 12 may include outbound capabilities, such as an SMS transmitter, email server, etc.

One or more processors 14 may be configured to receive the information sent by the third party from the third-party communication interface 12, such as the sending number or email address and the content of the notice. The processors 14 may query the storage 16, which may include an active directory and/or data store to determine which personnel should receive notifications from the third party via the sending number or email address, and store/save inbound communications information from third parties for historical tracking and identification of intended recipient personnel for third-party sending information not associated with entity personnel.

In various embodiments, the system 10 may employ text classification using various techniques such as the Naïve Bayes family of algorithms, support vector machines (SVM) and other deep learning strategies for analyzing the incoming messages from third parties.

The processors 14 may then send content of the notice to the personnel that are the intended recipient personnel of the notice from the third party via the personnel interface 18, which may be in various forms, such as a SMS message, an email, etc. The personnel interface 18 may include an SMS transmitter, email server, etc. and may include inbound capabilities as well. It will be appreciated that in various embodiments, the third-party communication interface 12 and personnel interface 18 may be embodied in the same equipment that may be controlled to perform the different function by the processors 14.

The system 10 may include the administrative interface 20, which may be in the form of a web portal and/or downloadable application that may be run on various platforms, such as mobile, portable (laptops), and stationary computing devices (desktops, servers, etc.). Access to the system 10 may be managed by system administrators of the entity and provided to various entity personnel to support the management of inbound communications.

As noted above, the system 10 may further include the traffic monitor 22 to monitor outbound communications from entity personnel to identify notification information being sent to third parties. The traffic monitor may be further configured to manually and/or automatically change contact information being sent by entity personnel to third parties to contact information associated with the entity that will be received and processed by the system 10. The traffic monitor 22 may be embodied in separate processors or the functionality may be embodied in the processors 14 performing and/or controlling other functions in the system 10. In addition, the traffic monitor 22 may employ the third-party communication interface 12 and/or personnel interface 18 to communicate with the third parties and/or entity personnel as shown in FIGS. 1 and 2.

Figure 3:
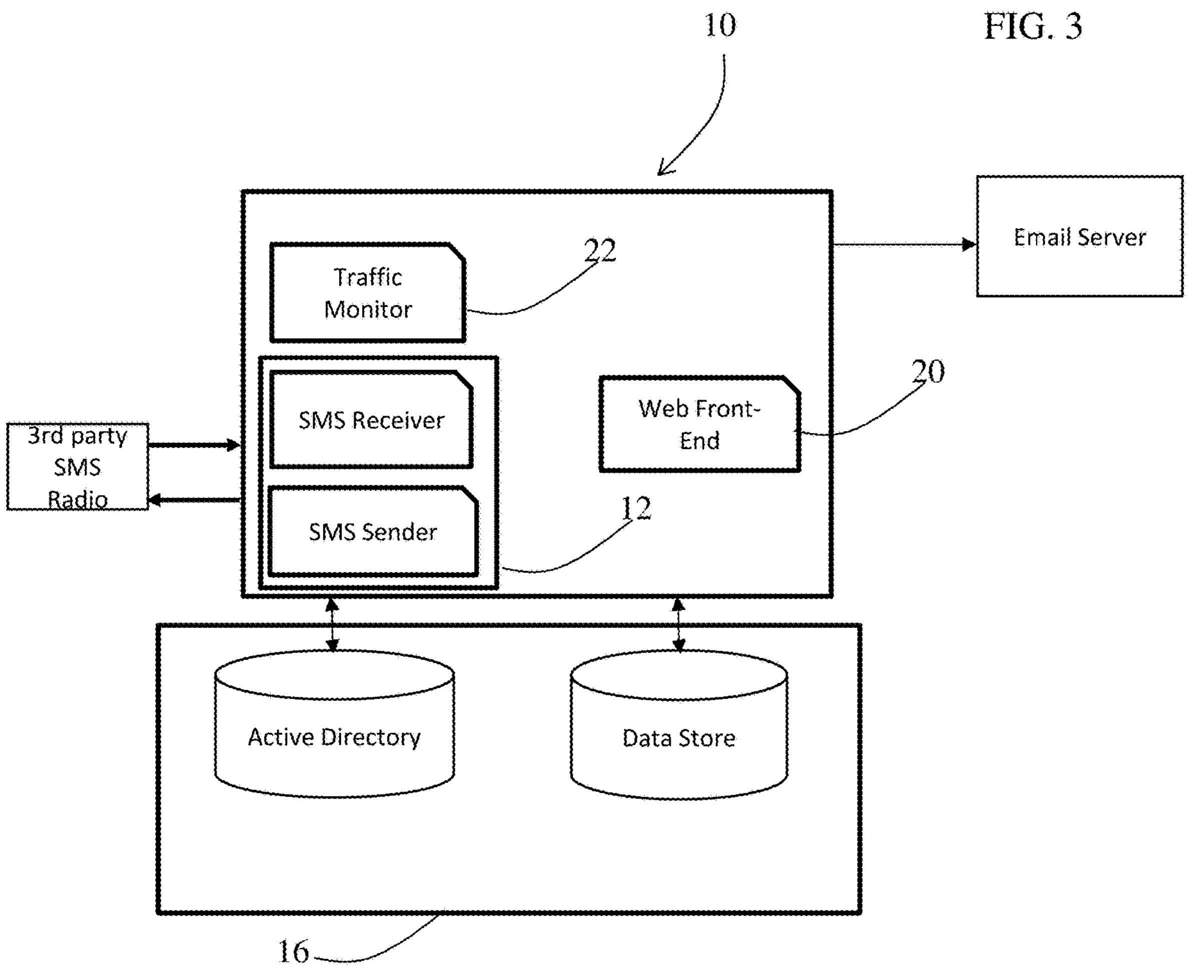

FIG. 3 depicts embodiments of the system 10 that may be employed to receive and process third-party communications in the form of SMS messages. In exemplary operations, a user of the system 10, i.e., entity personnel, visits a web site, such as a financial services site, that requests a cell phone number to send a code for N-FACTOR authentication. The user provides the cell phone number of the entity that has been assigned to process inbound N-FACTOR authentication codes. In various embodiments, the system 10 may identify, via the traffic monitor 22, the providing of the entity cell phone number and the user providing information, so that when the authentication SMS text is received, the system 10 will forward the authentication information to the user requesting access to the third-party service, but may forward it only if the user is authorized to access that third-party service by the entity. In other embodiments, the user may notify the system administrator that access to the third-party site has been requested, so the authentication information may be provided to the user upon receipt, if the third-party information is not already stored/saved in the system 10.

The system 10 may also be configured to forward authentication information to personnel that are assigned access rights to the third-party service, irrespective of the user that requested access, so the user may only receive the authentication code if they are authorized to receive it and/or to provide notification to other authorized users that other entity personnel are attempted to access the third-party service. For example, a CFO or controller may want to be informed every time personnel attempt to access a third-party site providing financial services to the entity.

The third-party interface 12 may be embodied as an SMS receiver and sender that receives the initial authentication/verification text and provides the text information to the processor 14 that searches the system storage 16, such as an active directory and/or data store, for an existing record for third-party SMS number and forwards the authentication/verification text to the entity personnel associated with the third-party SMS number. If the third-party SMS number is not found in storage 16, the processor may send an email to administrator or other personnel notifying the personnel of the notification received from the third party. The system administrator may then update the data store to direct inbound messages from the third party to the appropriate users.

When included and enabled in the system 10, the traffic monitor 22 may detect an entity SMS number being provided to a third party and update a database in Storage 16 to include website and the user's email that originated the authentication request. Optionally, the Traffic Monitor 22 may detect personal or non-entity phone numbers in outbound web traffic, then re-encodes the information being sent with organization's cell number(s). The Traffic Monitor 22 may also then notify the system administrator and/or user of the update.

The administrative interface 18 may be a web front-end that provides a data management interface and various administrative/management functions, such as generating reports of all incoming communications, entity personnel that received the information calls, if any, and other data logging information. The administrator may change the personnel that are supposed to receive incoming messages and may block various users or distribution groups from receiving various messages. In some embodiments, current infrastructure such as active directory/other LDAP services may be utilized to determine routing based on group membership. The web front end may also enable the administrator to forward the verification/authentication information to various users via SMS, a phone message (using text to speech) or email.

Figure 4B:
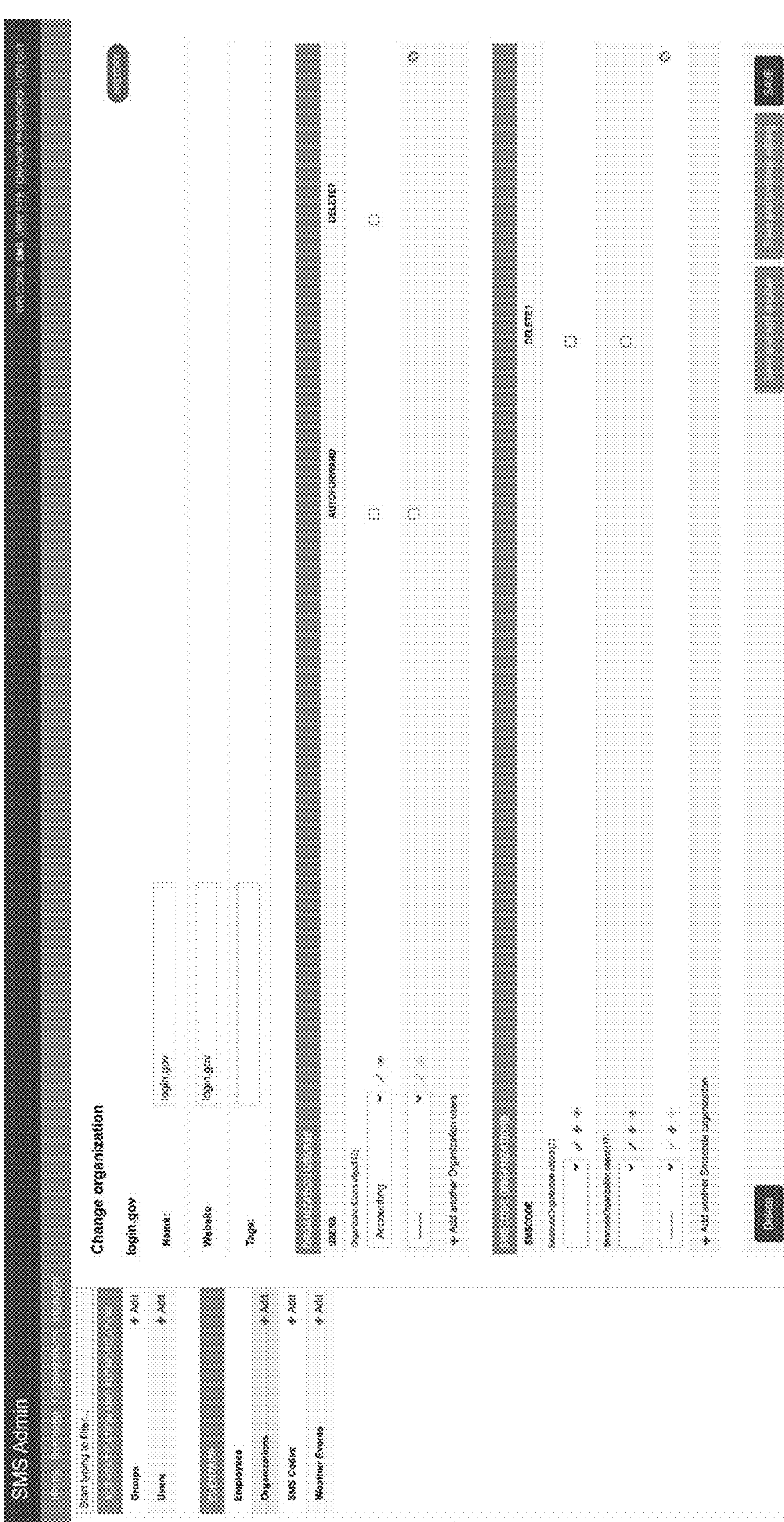

FIGS. 4A & 4B illustrates exemplary administrative interfaces of the present invention. FIG. 4A shows exemplary third-party organizations that may be managed via the administrative interface of the system 10. FIG. 4B depicts exemplary personnel profiles for interactions with the third parties that may be managed via the administrative interface of the system 10. It will be appreciated that the administrative interface may include other third parties, as well as fields and authorizations for personnel being provided with incoming codes, alerts, etc. from third parties.

Figure 5:
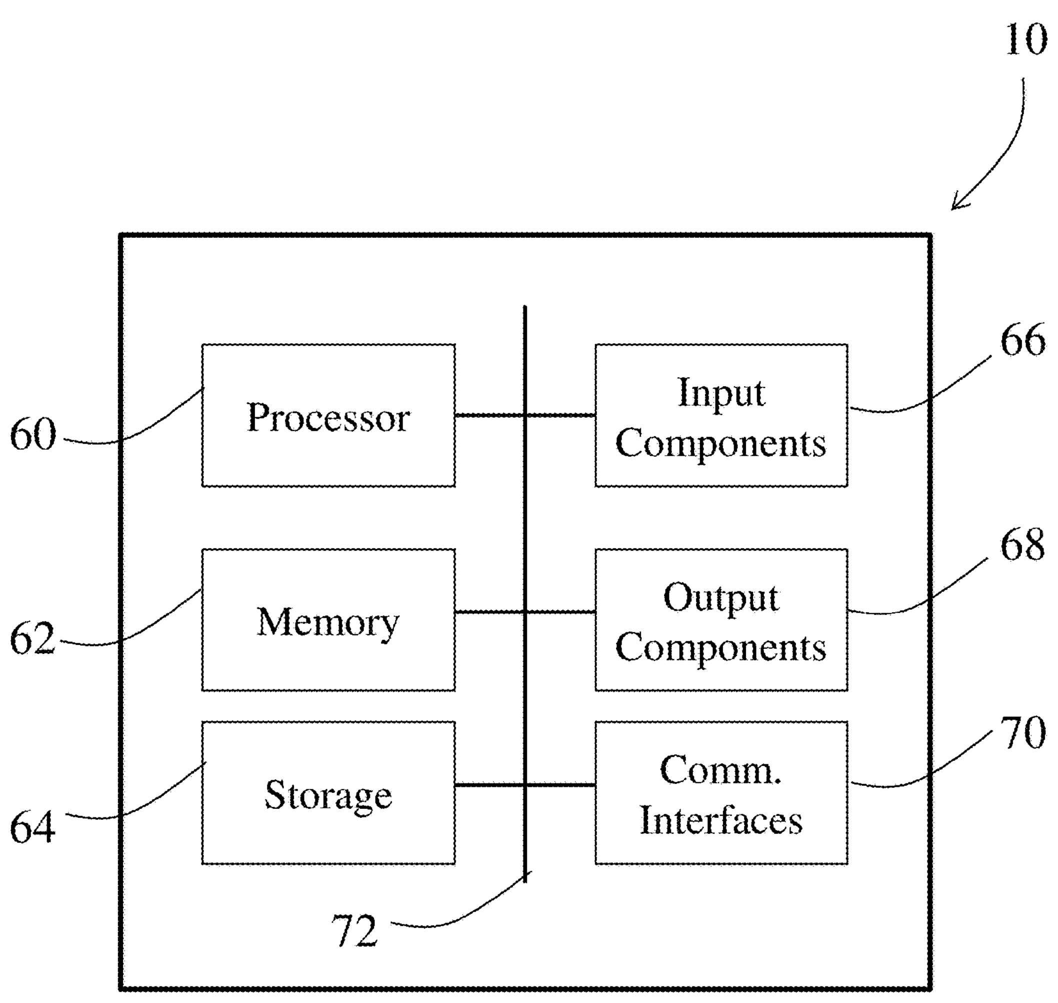
FIG. 5 illustrates exemplary components of devices and platforms for use in the present invention.

FIG. 5 illustrates exemplary component embodiments of various computing resources that may be employed in the system 10, and running various applications and performing various functions. The computing resources may each include one or more processors 60, memory 62, storage 64, input components 66, output components 68, communication interfaces 70, as well as other components that may be interconnected as desired by the skilled artisan via one or more buses 72. As previously described, the components of the various computing resources may often be configured as a single device or multiple interdependent or stand-alone devices in proximity and/or distributed over geographically remote areas.

Processor(s) 60 may include one or more general or Central Processing Units ("CPU"), Graphics Processing Units ("GPU"), Accelerated Processing Units ("APU"), microprocessors, and/or any processing components, such as a Field-Programmable Gate Arrays ("FPGA"), Application-Specific Integrated Circuits ("ASIC"), etc. that interpret and/or execute logical functions. The processors 60 may contain cache memory units for temporary local storage of instructions, data, or computer addresses and may be implemented as a single-chip, multiple chips and/or other electrical components including one or more integrated circuits and printed circuit boards that implements and executes logic in hardware, in addition to executing software.

Processor(s) 60 may connect to other computer systems and/or to telecommunications networks as part of performing one or more steps of one or more processes described or illustrated herein, according to particular needs. This can be accomplished through APIs or other methods, using a multitude of formats and p network protocols. Moreover, one or more steps of one or more processes described or illustrated herein may execute solely at the processor 60. In addition, or as an alternative, one or more steps of one or more processes described or illustrated herein for execution in one processor may be executed at multiple CPUs that are local or remote from each other across one or more networks.

The computing resources of the system 10 may implement processes employing hardware and/or software to provide functionality via hardwired logic or otherwise embodied in circuits, such as integrated circuits, which may operate in place of or together with software to execute one or more processes or one or more steps of one or more processes described or illustrated herein. Software implementing particular embodiments may be written in any suitable programming language (e.g., procedural, object oriented, etc.) or combination of programming languages, where appropriate.

Memory 62 may include Random Access Memory ("RAM"), Read Only Memory ("ROM"), and/or another type of dynamic or static storage device, such as flash, magnetic, and optical memory, etc. that stores information and/or instructions for use by processor 60. The memory 62 may include one or more memory cards that may be loaded on a temporary or permanent basis. Memory 62 and storage 64 may include a Subscriber Identification Module ("SIM") card and reader.

Storage components 64 may store information, instructions, and/or software related to the operation of the system 10 and computing resources. Storage 64 may be used to store operating system, executables, data, applications, and the like, and may include fast access primary storage, as well as slower access secondary storage, which may be virtual or fixed.

Storage component(s) 64 may include one or more transitory and/or non-transitory computer-readable media that store or otherwise embody software implementing particular embodiments. The computer-readable medium may be any tangible medium capable of carrying, communicating, containing, holding, maintaining, propagating, retaining, storing, transmitting, transporting, or otherwise embodying software, where appropriate, including nanoscale medium. The computer-readable medium may be a biological, chemical, electronic, electromagnetic, infrared, magnetic, optical, quantum, or other suitable medium or a combination of two or more such media, where appropriate. Example computer-readable media include, but are not limited to fixed and removable drives, ASIC, Compact Disks ("CDs"), Digital Video Disks ("DVDs", FPGAs, floppy disks, optical and magneto-optic disks, hard disks, holographic storage devices, magnetic tape, caches, Programmable Logic Devices ("PLDs"), RAM devices, ROM devices, semiconductor memory devices, solid state drives, cartridges, and other suitable computer-readable media.

Input components 66 and output components 68 may include various types of input/output ("I/O") devices. The I/O devices often may include a Graphical User Interface ("GUI") that provides an easy-to-use visual interface between the user and system 10 and access to the operating system or application(s) running on the devices.

Input components 66 receive any type of input in various forms from users or other machines, such as touch screen and video displays, keyboards, keypads, mice, buttons, track balls, switches, joy sticks, directional pads, microphones, cameras, transducers, card readers, voice and handwriting inputs, and sensors for sensing information such as biometrics, temperature & other environmental conditions, such as air quality, etc., location via Global Positioning System ("GPS") or otherwise, accelerometer, gyroscope, compass, actuator data, which may be input via a component in the user device 12 and/or received via one or more communication interfaces 70.

Output component 68 may include displays, speakers, lights, sensor information, mechanical, or other electromagnetic output. Similar to the input, the output may be provided via one or more ports and/or one or more communication interfaces 70.

Communication interface 70 may include one or more transceivers, receivers, transmitters, modulators, demodulators that enable communication with other devices, via wired and/or wireless connections. Communication interface 70 may include Ethernet, optical, coaxial, Universal Serial Bus ("USB"), Infrared ("IR"), Radio Frequency ("RF") including the various Wi-Fi, WiMax, cellular, and Bluetooth protocols, such as Bluetooth, Bluetooth Low Energy (BLE), Wi-Fi (IEEE 802.11), Wi-Fi Direct, Super-WiFi, 802.15.4, WiMax, LTE systems, LTE Direct, past, current, and future cellular standard protocols, e.g., 4-5G, or other wireless signal protocols or technologies as described herein and known in the art.

Bus(es) 72 may connect a wide variety of other subsystems, in addition to those depicted, and may include various other components that permit communication among the components in the computing resources. The bus(es) 72 may encompass one or more digital signal lines serving a common function, where appropriate, and various structures including memory, peripheral, or local buses using a variety of bus architectures. As an example, and not by way of limitation, such architectures include an Industry Standard Architecture ("ISA") bus, an Enhanced ISA ("EISA") bus, a Micro Channel Architecture ("MCA") bus, a Video Electronics Standards Association Local Bus ("VLB"), a Peripheral Component Interconnect ("PCI") bus, a PCI-extended ("PCI-X") bus, a Peripheral Component Interconnect Express (PCIe) bus, a Controller Area Network ("CAN") bus, and an Accelerated Graphics Port ("AGP") bus.

The computing resources of the system 10 may provide functionality as a result of the processors 60 executing instructions, i.e., software, stored/embodied in one or more computer-readable storage media residing in the memory 62 and/or storage 64 and logic implemented and executed in hardware. The results of executing the software and logic may be stored in the memory 62 and/or storage 64, provided to output components 68, and transmitted to other devices via communication interfaces 70, which includes cloud storage and cloud computing. In execution, the processor 60 may use various inputs received from the input components 66 and/or the communications interfaces 70. The input may be provided directly to the processor 60 via the bus 72 and/or stored before being provided to the processor 60. Executing software may involve carrying out processes or steps may include defining data structures stored in memory 62 and modifying the data structures as directed by the software.

As used herein, the term component is intended to be broadly construed as hardware, firmware, and/or a combination of hardware and software. It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

The foregoing disclosure provides examples, illustrations and descriptions of the present invention, but is not intended to be exhaustive or to limit the implementations to the precise form disclosed. Modifications and variations are possible in light of the above disclosure or may be acquired from practice of the implementations. These and other variations and modifications of the present invention are possible and contemplated, and it is intended that the foregoing specification and the following claims cover such modifications and variations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A third-party message management system comprising:

a third-party interface configured to at least receive messages from a third party including third-party sender information and message content;

at least one storage device to store at least sender information and personnel information including at least contact information for a recipient personnel that is to receive the message content;

a personnel interface configured to communicate with recipient personnel including sending at least the message content to the recipient personnel;

at least one processor to receive sender information and message content from the third-party communication interface, query the at least one storage device to determine whether the sender information is stored in the storage, store at least sender information and personnel information associated with the sender information, retrieve personnel contact information associated with the stored sender information, and send the message content to personnel using the retrieved personnel contact information via the personnel interface; and, an administrative interface configured to enable an administrator to instruct the at least one processor to input and output data and perform at least one of the queries, store, retrieve, and send functions.

2. The system of claim 1, further comprising:

a traffic monitor to monitor outbound communications from personnel to the third party.

3. The system of claim 2, wherein the traffic monitor is also to change phone numbers detected in communications from personnel to an entity phone number associated with the system.

4. The system of claim 1, the at least one storage device including an active directory and a data store.

5. The system of claim 1, wherein the third-party interface and personnel interface include at least one of a Short Message Service (SMS) transmitter, SMS receiver, telephonic equipment, text-to-speech, and an email server.

6. The system of claim 1, wherein the administrative interface is at least one of a web portal and a software application.

7. The system of claim 1, wherein the at least one processor is further to store the date and time that the sender information and message content was received by the third-party interface along with the sender information and message content.

8. A method of managing third-party messages comprising:

providing to a third-party sender, via a third-party interface, entity contact information to receive messages;

receiving, via the third-party interface, third-party sender information and message content;

providing, via the third-party interface, third-party sender information and message content to at least one processor;

querying, via the at least one processor, at least one storage device to determine whether the sender information is stored in the at least one storage device;

storing, via the at least one processor, at least sender information and personnel information associated with the sender information in the at least one storage device;

retrieving via the at least one processor, from the at least one storage device personnel information associated with the stored sender information;

sending, via the personnel interface, the message content to personnel using the retrieved personnel information; and, enabling, via an administrative interface, an administrator to instruct the at least one processor to perform at least one of the query, store, retrieve, and send functions.

9. The method of claim 8, further comprising:

monitoring, via a traffic monitor, internet traffic from personnel to detect phone numbers being sent by personnel to third-party website and change the phone numbers to phone numbers associated with entity.

10. The method of claim 8, further comprising:

monitoring, via a traffic monitor, outbound communications from personnel to the third party.

11. The method of claim 8, wherein the at least one storage device includes an active directory and a data store.

12. The method of claim 8, wherein the third-party interface and personnel interface include at least one of a Short Message Service (SMS) transmitter, SMS receiver, telephonic equipment, text-to-speech, and an email server.

13. The method of claim 8, wherein the administrative interface is at least one of a web portal and a software application.

14. The method of claim 8, wherein storing includes storing the date and time that the sender information and message content was received by the third-party interface along with the sender information and message content.

15. A third-party message management system comprising:

a Short Message Service (SMS) receiver configured to receive SMS messages from a third party including third-party sender information and message content;

a database to store the sender information and message content, and personnel information including contact information for recipient personnel that are to receive the message content;

an email server to send the message content via email to the recipient personnel;

at least one processor to receive sender information and message content from the SMS receiver, query the database to determine whether the sender information is stored in the database, store the sender information and personnel information of the recipient personnel and associate the recipient personnel with the sender information, retrieve personnel information associated with the stored sender information from the database, and send the message content to recipient personnel using the retrieved personnel information via the email server; and, one of a web portal and downloadable software application to enable an administrator to instruct the at least one processor to perform at least one of the query, store, retrieve, and send functions.

16. The system of claim 15, further comprising:

a traffic monitor to monitor outbound communications from personnel to the third party.

17. The system of claim 16, wherein the traffic monitor is configured to change phone numbers detected in communications from personnel to an entity phone number associated with the system.

18. The system of claim 15, wherein the database includes an active directory and a data store.

19. The system of claim 15, wherein the at least one processor is further configured to provide the message content to recipient personnel via at least one of a Short Message Service (SMS) transmitter, telephonic equipment, and text-to-speech equipment.

20. The system of claim 15, wherein the at least one processor is further to store the date and time that the sender information and message content was received by the third-party interface along with the sender information and message content.

* * * * *